United States Patent
Steele et al.

(10) Patent No.: US 7,583,607 B2
(45) Date of Patent: Sep. 1, 2009

(54) METHOD AND APPARATUS FOR DESIGNATING AND IMPLEMENTING SUPPORT LEVEL AGREEMENTS

(75) Inventors: Douglas W. Steele, Fort Collins, CO (US); Katherine C. Hogan, Fort Collins, CO (US); Randall B. Campbell, Fort Collins, CO (US); Alberto Squassabia, Fort Collins, CO (US); Todd M. Goin, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1083 days.

(21) Appl. No.: 10/379,662

(22) Filed: Mar. 6, 2003

(65) Prior Publication Data

US 2004/0174823 A1  Sep. 9, 2004

(51) Int. Cl.
*H04L 12/26* (2006.01)
(52) U.S. Cl. ............... 370/252; 709/223; 709/224; 709/225; 709/226
(58) Field of Classification Search .......... 370/252; 709/223, 224, 225, 226
See application file for complete search history.

(56) References Cited

U.S. PATENT DOCUMENTS

| | | | |
|---|---|---|---|
| 6,073,175 A | 6/2000 | Tavs et al. | |
| 6,363,053 B1 | 3/2002 | Schuster et al. | |
| 6,366,563 B1 | 4/2002 | Weldon et al. | |
| 6,681,232 B1 * | 1/2004 | Sistanizadeh et al. | 707/104.1 |
| 6,857,020 B1 * | 2/2005 | Chaar et al. | 709/226 |
| 7,062,559 B2 * | 6/2006 | Yoshimura et al. | 709/226 |
| 7,082,138 B2 * | 7/2006 | Yik et al. | 370/410 |
| 7,120,694 B2 * | 10/2006 | Sinha | 709/228 |
| 7,165,115 B2 * | 1/2007 | Bouillet et al. | 709/232 |
| 2002/0039352 A1 * | 4/2002 | El-Fekih et al. | 370/252 |

OTHER PUBLICATIONS

Agilent OSS Firehunter (Service Quality Manager), http://w e.home.agilent.com/cgi-bin/bvpub/agilent/product/cp_product.jsp?OID= 536882909 Nov. 26, 2002.

* cited by examiner

*Primary Examiner*—William Trost, IV
*Assistant Examiner*—Toan D Nguyen (57) ABSTRACT

An apparatus, system, and a corresponding method, for designating and implementing support level agreements (SLAs). A customer forwards a query defining required resources. Predetermined support level agreement options are then provided to the user based upon the required resources. The customer then forwards their selection of a particular predetermined support level agreement, which includes a plurality of measurement monitors and corresponding non-compliance thresholds defined therein. Based upon the particular support level agreement selected by the customer, service for that customer is enabled.

20 Claims, 4 Drawing Sheets

| COMPONENT | | MEASUREMENT MONITOR | | RANGE |
|---|---|---|---|---|
| V CLASS | ☐ | AVAILABILITY | 99% | ▽ ▨ △ 99.99 |
| SERVICE GUARD | ☐ | AVAILABILITY | 99% | ▽ ▨ △ 99.999 |
| ORACLE ENT | ☐ | TRANSACTIONS / SECOND | 1000 | ▽ ▨ △ 5000 |
| APACHE SERVER | ☐ | RESPONSE TIME | 2ms | ▽ ▨ △ 10ms |
| E BUSINESS BUNDLE | ☐ | AVAILABILITY ~313 | 99% | ▽ ▨ △ 99.999 |
| | ☐ | RESPONSE TIME ~315 | 2ms | ▽ ▨ △ 10ms |
| SAP | ☐ | TRANSACTION / SEC | 2000 | ▽ ▨ △ 7500 |
| | ☐ | RESPONSE TIME | 2ms | ▽ ▨ △ 10ms |

301 — COMPONENT
303 — MEASUREMENT MONITOR
305 — RANGE
307
309
311
317
313
315

[CREATE SLA BUNDLE] — 319

METHOD AND APPARATUS FOR DESIGNATING AND IMPLEMENTING SUPPORT LEVEL AGREEMENTS

BACKGROUND

The Internet is a packet-switched network that generally provides a single class of service. In a single class of service network, packets transmitted between a source and destination are of equal priority. A single class of service network therefore sends all packets without regard to the type of communication, and the transmission of certain data may be delayed. Single-class service may be insufficient to support throughput-dependent applications, such as multimedia applications, because of the expected delays in transmission.

Remote access servers supporting multiple classes of services may alleviate the problems associated with single-class service. Multiple classes of service may be accomplished by support level agreements between carriers and customers. A support level agreement (SLA) is an agreement between a carrier and a customer that defines the terms of the carrier's responsibility to the customer and the how the customer is to be compensated if the terms of the SLA are not met. Relevant considerations in an SLA include, among other considerations, availability, delay, throughput, customer service and cost.

An SLA pricing scheme may charge customers according to the priority at which messages are transmitted, the volume of messages sent, the number of messages sent, minimum throughput or availability standards, and many other factors. SLAs are typically generated when a customer presents certain parameters, such as mean bit-rate, maximum burst size, etc., to a carrier network administrative entity (NAE), such as an Internet service provider (ISP), and the NAE agrees to provide the parameters. The quality of service (QoS) provided by the NAE can then be monitored to ensure that the NAE provides adequate service under the SLA.

Known methods of forming SLAs are inefficient because each customer is required to provide SLA parameters to an NAE, and NAEs are formed on a case-by-case basis. The formation of individualized SLAs for a multitude of customers is costly and may discourage less sophisticated customers wishing to form and SLA with an NAE.

SUMMARY

An apparatus, system, and a corresponding method, for designating and implementing support level agreements (SLAs) are disclosed. A customer forwards a query defining required resources. Predetermined support level agreement options are then provided to the user based upon the required resources. The customer then forwards their selection of a particular predetermined support level agreement, which includes a plurality of measurement monitors and corresponding non-compliance thresholds defined therein. Based upon the particular support level agreement selected by the customer, service for that customer is enabled.

DESCRIPTION OF THE DRAWINGS

The detailed description will refer to the following figures, in which like numbers refer to like elements, and in which.

DETAILED DESCRIPTION

The following table may be used to clarify terms used in the detailed description of the system and method described herein.

| | |
|---|---|
| AOII | Always-On Internet Infrastructure |
| NOC | Network Operations Center |
| CONTROL PLANE | one or more instances of AOII resource manager |
| MDC | Mini Data Centers |
| END-CUSTOMER | entity that buys resources managed via AOII |
| MID-CUSTOMER | entity that buys an instance of AOII |
| QoS | Quality Of Service |
| SLA | Support Level Agreement |
| NAE | Network Administrative Entity |
| IDC | Internet Data Center |
| UDC | Utility Data Center |

An apparatus, and a corresponding method, for designating and implementing support level agreements (SLAs) are disclosed. One embodiment uses a model to describe various levels of SLAs. Each SLA level uses pre-specified measurement tools to police the parameters/requirements of the deployed SLA. A modeling language is used to define the SLA levels and then applies the implementation of the level definition to actually generate a specific SLA.

For instance, in one embodiment, three levels of SLA are defined: Silver, Gold, and Platinum. A silver-level SLA might be for a simple web site server, where a customer requires 99% uptime and 10 millisecond (ms) response time. A gold-level SLA might be for an SAP application environment residing in a data center in an Always-On Internet Infrastructure (AOII) environment. The SAP environment requires a 99.5% uptime with a 5 ms response. Customers requiring a higher level of service, for industries with critical response time requirements, or data protection, might choose the platinum-level SLA.

Figure 1:
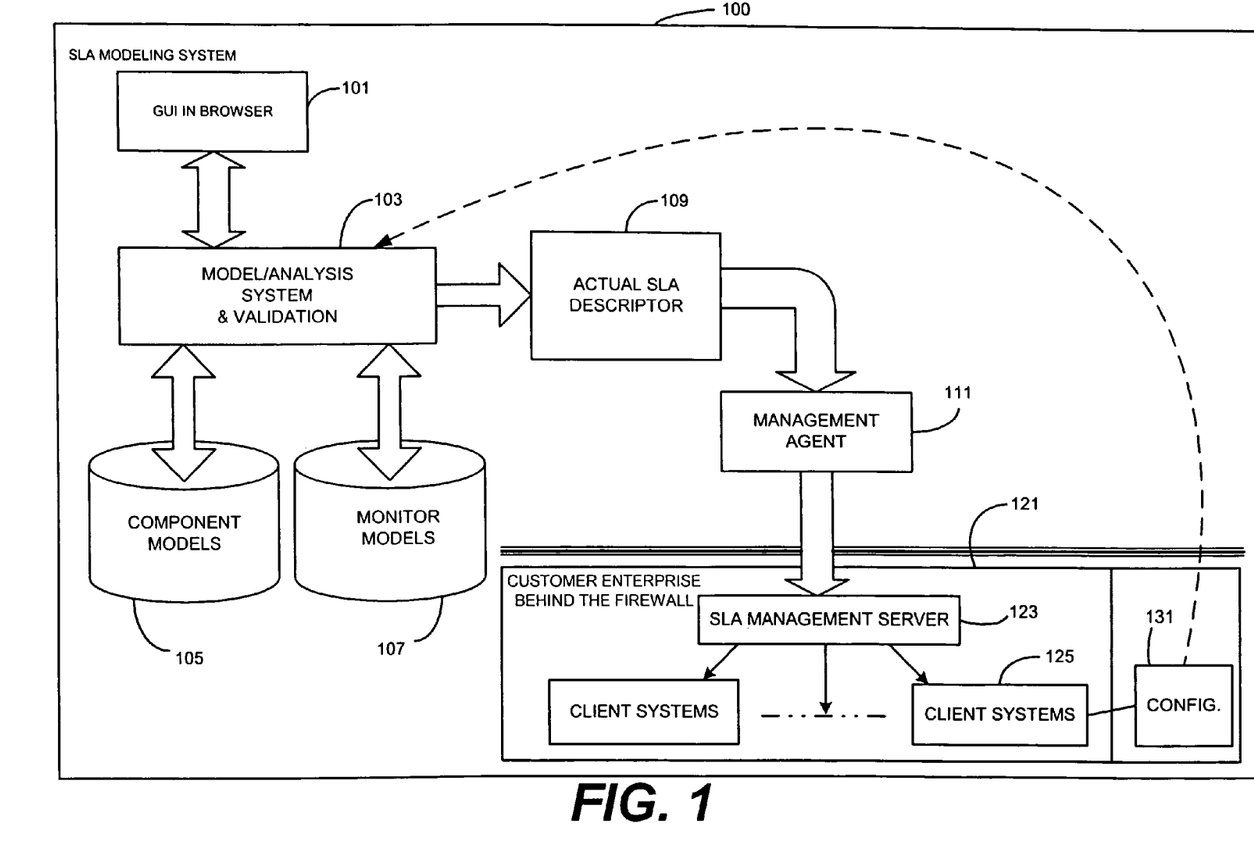
FIG. 1 is a block diagram of an embodiment of an exemplary service level agreement modeling system.

Referring now to the drawings, and in particular to FIG. 1, there is shown a block diagram illustrating an exemplary SLA modeling system 100. The exemplary SLA modeling system 100 has a graphic user interface (GUI) 101 coupled with a model/analysis system and validation module 103. The GUI 101 is used by a salesman or SLA manager to design the SLA for a specific customer or bundle of components. Component models 105 are pre-defined to identify all possible components for which a SLA can be formed. Monitor models 107 are pre-defined to identify which measurement, or monitoring, tools are available for corresponding components.

In one embodiment, XML (eXtended Markup Language) is used to define the component models 105 and the corresponding monitor models 107. An excerpt from an exemplary XML file appears below:

```
<?xml version="1.0"?>
<!-- the first section represents the MONITOR MODEL Information -->
<SLA_MONITOR>
  <NAME>XactPerSecond</NAME>
    <COMMAND>ping tnslsnr</COMMAND>
```

-continued

```
<LEVEL>
    <LEVEL_1>
        <NAME>Silver</NAME>
            <THRESHOLD>100</THRESHOLD>
            <COST>1000</COST>
            <PENALTY>.003</PENALTY>
    </LEVEL_1>
    <LEVEL_2>
        <NAME>Gold</NAME>
            <THRESHOLD>500</THRESHOLD>
            <COST>10000</COST>
            <PENALTY>.03</PENALTY>
    </LEVEL_2>
    <LEVEL_3>
        <NAME>Platinum</NAME>
            <THRESHOLD>1500</THRESHOLD>
            <COST>100000</COST>
            <PENALTY>.3</PENALTY>
    </LEVEL_3>
</LEVEL>
</SLA_MONITOR>
<!--- This next section is from the COMPONENT MODEL
Information -->
<COMPONENTS>
    <SLA_COMPONENT>
        <NAME>VClass Server</NAME>
            <CostMultiplier>5</CostMultiplier>
            <OSSupported>HP-UX</OSSupported>
            <SLA_MONITOR>XactPerSec</SLA_MONITOR>
            <SLA_MONITER>Avail</SLA_MONITOR>
    </SLA_COMPONENT>
    <SLA_COMPONENT>
        <NAME>Oracle Enterprise Server</NAME>
            <CostMultiplier>5</CostMultiplier>
            <OSSupported>HP-UX, Windows 2000
            DataCenter</OSSupported>
            <SLA_MONITOR>XactPerSec</SLA_MONITOR>
            <SLA_MONITER>Avail</SLA_MONITOR>
    </SLA_COMPONENT>
</COMPONENTS>
<!--- This next section is from the COMPONENT BUNDLES MODEL
Information -->
<SLA_BUNDLES>
    <BUNDLE>
        <SLA_COMPONENT>Oracle Enterprise
        Server</SLA_COMPONENT>
        <SLA_COMPONENT>VClass Server</SLA_COMPONENT>
        <SLA_COMPONENT>Other pre-configured
components</SLA_COMPONENT>
    </BUNDLE>
</SLA_BUNDLES>
```

There are three sections in this example. The first section is labeled <SLA_MONITOR> and defines a transactions-per-second (XactPerSecond) measurement tool. This tool has three inherent levels of service, i.e., silver, gold and platinum. Each level is associated with a threshold, cost, and penalty. It will be apparent to one of ordinary skill in the art that various thresholds can be defined, for instance, a notification threshold, a warning threshold and an action threshold. In this example, when the notification threshold is reached, a notification is sent to the system administrator. When the warning threshold is reached, the responsible person is paged, and when the action threshold is reached, some emergency action is performed. It will also be apparent to one of ordinary skill in the art that other monitors/measurements will be defined and may have additional characteristics for each SLA-level.

The second section is the <SLA_COMPONENT> section. This section defines the available components. In the example above, two components are defined: VClass Server and Oracle® Enterprise Server. Each component has a corresponding cost-multiplier, operating system supported, and available monitors. The cost multiplier indicates the relative cost of the component compared to some specified base component. In this example, the Vclass server supports HP-UX operating system, but the Oracle® Enterprise Server supports both HP-UX and Windows 2000 Datacenter operating systems. Both exemplary components are capable of running a transaction per second monitor and availability monitor.

The third section is the <SLA_BUNDLES> section. In the exemplary configuration only one bundle is pre-defined, i.e., BUNDLE. The defined bundle includes an Oracle® Enterprise Server, Vclass server and Other Pre-configured components. It will be apparent to one of ordinary skill in the art that a variety of pre-defined bundles can be present in the model.

Referring again to FIG. 1, a user operates the GUT 101 to define required components and an SLA-level. The allowed components and monitors are retrieved by the model/analysis system and validation module 103 so that the user is presented only with valid choices. Once the desired SLA has been selected through the GUT 101, an SLA descriptor 109 is generated. This descriptor is a formatted list of components, selected SLA-level(s) and appropriate monitors and thresholds. It will be apparent to one skilled in the art that the descriptor can be in the form of a flat file, comma separated list, instantiated objects, or any other form. The descriptor 109 is read by a management agent 111. The management agent 111 reformats the descriptor for a selected customer enterprise 121. The customer enterprise 121 has an SLA management server 123, such as Agilent OSS Firehunter (Service Quality Manager), available from Agilent Technologies. Each SLA management server requires a specific format of input to deploy monitoring tools and monitor enterprise performance. An SLA management server generates code or deploys monitoring agents deploying software, and configures software into the environment that actually returns those values. The management agent 111 translates the SLA descriptor 111 into the appropriate format.

Figure 2:
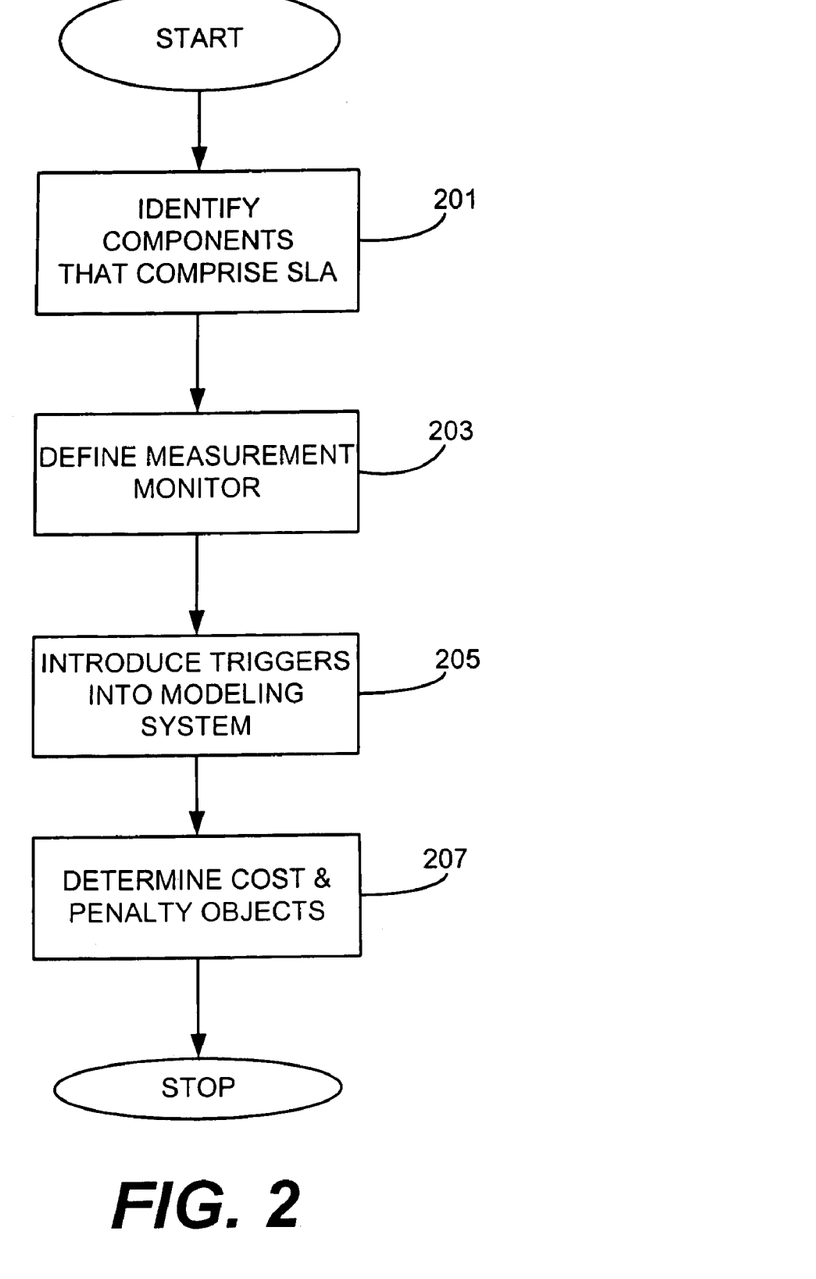
FIG. 2 is a flow chart illustrating an embodiment of a method of implementing a support level agreement.

Referring now to FIG. 2, there is shown a flow chart illustrating a method for building an SLA model. In preparation for building an SLA model, individual components that comprise a service level agreement are identified in step 201. Components include a subject component having a series of attributes and representing items in the system such as computers, applications, a network service, and throughput of computer's operating system. The components define the items on which measurements will be taken in order to ensure that the SLA is in compliance. For instance, the model for a specific-level service agreement could include the specific processes that are to be run on each computer in the deployed system. A network service subject component would define the delivery mechanism of its service. An attribute of an operating system might be to include the available disk space.

It is apparent that given full latitude, customers could define an infinite number of unique systems, requiring a corresponding SLA. One embodiment of the present system and method limits a customer to a finite number of system, or application, categories. Alternative embodiments have a larger or smaller number of categories, and some embodiments allow a customer to customize a specific system type to effect a new category of service. For instance, one category, or type, of SLA is directed toward specific applications that are required by the customer.

Once the subject components of the various categories of systems corresponding to an SLA are defined, measurement monitors for each component are defined in step 203. For instance, a system having an Oracle® database (type=application) might require measurement for throughput or transaction time. An existing tool for measuring Oracle® database throughput is used to obtain the average throughput to determine compliance. The preferred existing tool is defined as the measurement device in the model for this subject component. Another measurement tool might be to obtain the quantity of disk space being used by the Oracle® database. The defined measurement commands specific to Oracle® are defined for this subject component. An Oracle® network service component (type=network) might require a set of measurements that are both similar and dissimilar to the Oracle® database component. Similar measurement tools would be run over the network, i.e., a network query against Oracle® database, but would effectively yield similar reports.

A component is modeled to define all measurement types that are possible for that component. However, all measurements are not applicable to all SLAs. Therefore an instantiation of an SLA model will define which measurements are required for the specific-level SLA. For instance, in one embodiment, at the silver-level SLA, Oracle® transaction time is measured, but at the gold-level, both Oracle® transaction time and available disk space are measured.

Each specific-level SLA will have a set of requirements that must be met in order to be in compliance. For instance, for SLAs related to database systems, a transaction time or throughput measurement will typically be a requirement. Various level SLAs will have a different trigger, or threshold, defined for a given measurement type. These triggers are defined in step 205. Typical measurements for an SLA are throughput, disk space and availability. Different level SLAs will have different triggers/thresholds. For instance, a gold-level SLA might require 99.5% availability, while a platinum-level SLA might require 99.9% availability.

Another aspect of defining triggers is to define a method of notification when the threshold is exceeded. In some embodiments, an e-mail notification is sent when the threshold is approached. In this embodiment, the trigger is the defined as the notification point and the threshold is defined as the non-compliance point. In other embodiments, a pager notification is sent when the threshold is approached. The notification may be sent before the threshold is reached, so that intervention can be performed, thereby avoiding exceeding the threshold. In some embodiments, a notification is sent only after the threshold has been exceeded. In an embodiment, triggers and thresholds are defined at multiple levels for each SLA. For instance, a low, medium and high warning can be modeled for varying non-compliance thresholds.

Once the thresholds and/or triggers are defined in step 205, the costs and penalties are defined in step 207. A key reason that customers want SLAs is so that they can point to concrete parameters which show that the service provider has breached the service agreement, e.g. the network failed to be available 99.5% of the time. Breaching the service agreement has costs associated. The penalties for a breach must be defined in advance. For instance, a service provider might be willing to refund 10% of a monthly access fee for availability degradation of 10% or less. In another SLA, a service provider might be forced to upgrade the disk drives for a disk space degradation of 20% or more. The penalties and costs are built into the varying level SLAs. For instance, a service provider might agree that the monthly fee for a gold-level SLA is $1000, which provides for a specific level of performance. Once all of these parameters (e.g., components, SLA types, triggers, penalties/costs, etc.) are defined, an SLA can be built for a specific customer.

Figure 3:
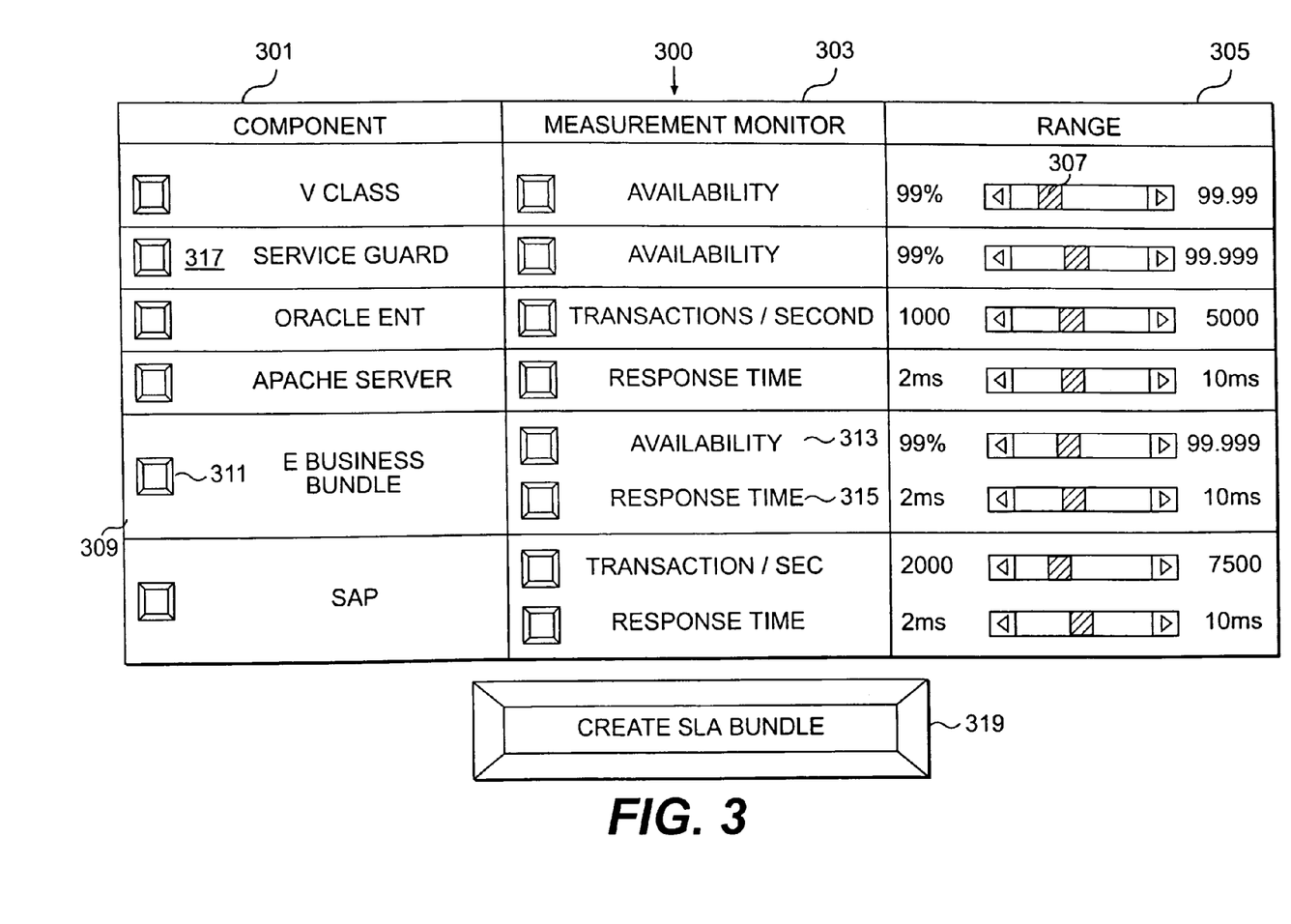
FIG. 3 is an exemplary embodiment of a screen display selecting components and their characteristics for automatically building a service level agreement.

Referring now to FIG. 3, there is shown an exemplary display window 300 for interactively selecting components and thresholds for an SLA. An SLA can be built and deployed easily from the models developed in the building stage. In one embodiment, a graphic user interface (GUI) is used to assist in building an SLA. Once a customer has defined system requirements, the service provider brings up a display window 300 to select components, associated measurement monitors and threshold ranges. The first column 301 lists the modeled components. If a customer desires components not listed, then the component 105 model would require modification before building the SLA. The second column 303 contains measurement monitors for the corresponding component. The measurement monitor information is derived from the monitor models 107 that correspond to the selected components. Column three 305 contains a threshold selection field which corresponds to a measurement monitor. In one embodiment, the method of threshold selection is to use a sliding bar 307.

Once it is known which components are needed for a customer's system, the corresponding component model information populates the GUI display. Based on the selected components, the corresponding monitor model information also populates the GUI display. The SLA-level, i.e., silver, gold or platinum can then be selected. The GUI user makes a decision regarding SLA-level based on a cost.

If the customer desires an SLA for an e-business bundle, the service provider selects the component, e-business bundle 309. In one embodiment, this selection is performed by clicking on the button 311 which corresponds to the desired component. This component has two corresponding measurement monitors: availability 313 and response time 315. In some cases, only one measurement monitor is selected by a given SLA; the customer might be uninterested in response time, but very interested in availability. The required measurement monitor is selected, typically by a mouse click. The range, or threshold is then selected in column three 305. Once the components, monitors and thresholds have been selected, the models are instantiated and penalty/cost information is applied. For instance, for a Service Guard component 317, three levels of service may be defined. In one embodiment, if the customer desires 99% availability, it will cost $1000/month; 99.5% availability will cost $10,000/month and 99.9% availability will cost $100,000/month. The corresponding penalties will be proportional to the monthly fees.

In another embodiment, there are several measurement monitors associated with a subject component. In this case, it is more efficient and user friendly to enable a pull down menu of measurement monitors rather than having a separate button for each, as shown in the second column 303. In this embodiment, each measurement monitor is selected in turn and then its range/threshold is selected, in column three 305, before the next measurement monitor is selected from the pull down menu. It will be apparent to one of ordinary skill in the art that a variety of user interfaces can be used to effect the same selections. Another embodiment uses discrete selections for the threshold, rather than a sliding scale, to correspond to a specific-level SLA. In yet another embodiment, both triggers for notification and thresholds for non-compliance may be selected. A notification method, i.e., e-mail or page, etc., can be selected as well.

When the service provider has completed entering SLA parameters in the display window 300, the SLA bundle is created, typically after clicking on a "create" button 319. In one embodiment, the SLA creation automatically generates two deliverables. A first deliverable is akin to a compiled version of the instantiated model. This code can be deployed to the delivered system to enable the appropriate monitors, thresholds and notification methods. In some embodiments, this code is an installation module. When run on the target system, the measurement monitors and notification processes are automatically installed with the selected triggers/thresholds. A second deliverable is a textual version of the SLA, as would be included in the actual provider contract. The text defines the subject components, costs, penalties, etc. This automatic generation of a deployable SLA provides a significant improvement over the prior art. Systems and SLAs can be deployed in 10% of the time, or less. A significant advantage of the system and method described herein is that of being able to create accurate, applicable SLAs the first time. Only valid choices can be made. Further, the present system and method is likely to be 500% faster than the methods of the prior art.

In a possible scenario, a sales representative ("SALES-REP") from the service provider visits a customer. The SALES-REP has a laptop capable of connecting to a web service running the SLA modeling tool, as described above. The customer enumerates all of the system requirements. The SALES-REP enters the data into the SLA modeling tool and modifies the monitor and threshold parameters in real time. The customer can modify the requirements of the SLA on the fly, to account for the costs and penalties derived from the model. In one embodiment, the SALES-REP accesses the SLA modeling tool via a wireless web. In other embodiments, the tool runs stand-alone on a laptop, or other computing device. It will be apparent to one of ordinary skill in the art that the model may be accessed by a variety of user interfaces in stand-alone or network environments. Once the SLA is completed to the customer's satisfaction, it can be built and generated, and the requirements then automatically sent to the manufacturing/build division of the service provider.

SLAs are typically used when a customer is leasing systems in a Internet data center (IDC). A typical IDC of the prior art consists of one or more separate enterprises. Each customer leases a separate local area network (LAN) within the IDC, which hosts the customer's enterprise. The individual LANs may provide an always-on Internet infrastructure (AOII), but require separate maintenance and support. A utility data center (UDC), as described in co-pending application Ser. No. 10/141,072 entitled "System And Method For Remotely Monitoring And Deploying Virtual Support Services Across Multiple Virtual LANS (VLANS) Within A Data Center", filed on May 9, 2002, and herein incorporated by reference, enables remote monitoring and deploying of virtual support services across multiple virtual LANs (VLANs) within a data center. A customer procuring an enterprise in an IDC or UDC will typically require an SLA to ensure that expectations of throughput and availability are met.

In a UDC environment, the automatically generated SLA deployment will install remote and/or local monitors on the customer's virtual local area network (VLAN), or enterprise. In this environment, a single network operator is capable of monitoring multiple enterprises. In one embodiment, an enterprise triggers a notification to the network operator at a network operation center (NOC). If the notification indicates that disk space is low for a specific enterprise, the network operator can reconfigure the customer's VLAN to include additional disk space residing in the UDC. In another embodiment, a control plane, which is hierarchically between the VLANs and the NOC, will automatically reconfigure the customer's VLAN as a result of a trigger notification. The control plane controls a set of operably connected resources within the NOC. A NOC may have several control planes within the UDC.

Figure 4:
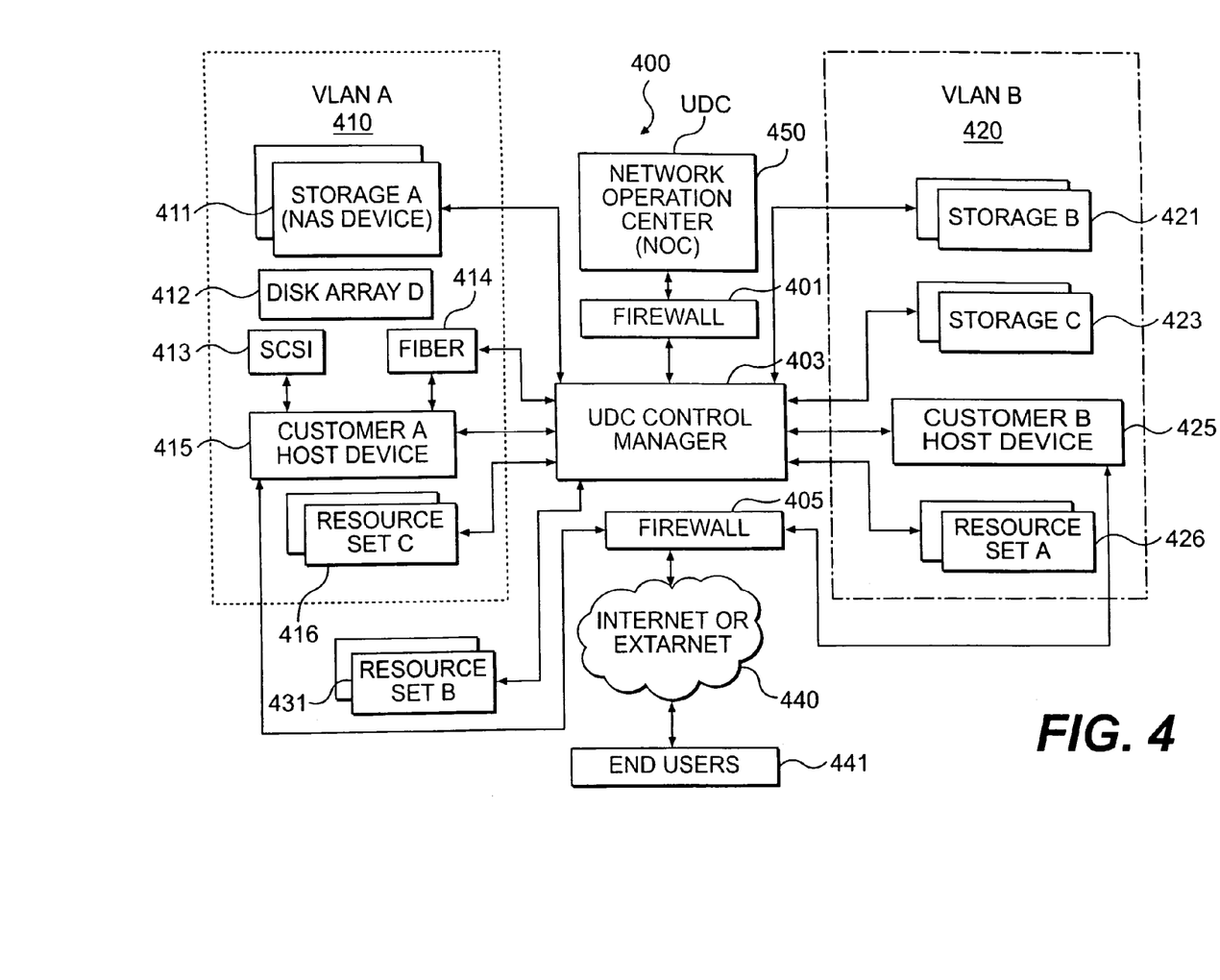
FIG. 4 shows an exemplary hierarchical representation of the two virtual networks (VLANs) in a utility data center (UDC).

Referring now to FIG. 4, there is shown a hierarchical representation 400 of two virtual networks (VLANs) in a UDC. VLAN A 410 is a hierarchical representation of the virtual network comprising mini-data center (MDC) A, or enterprise. VLAN B 420 is a hierarchical representation of the virtual network comprising a mini-data center (MDC) B. The control plane manager 403 controls message traffic between the MDC host device(s) (415 and 425), their peripheral devices/resources (411, 412, 416, 421, 423 and 426). An optional fiber of SCSI (small computer system interface) network 413, 414 may be used so that the VLAN can connect directly to storage device 412. The fiber network is assigned to the VLAN by the control plane manager 403. The VLANs can communicate to an outside network, e.g., the Internet 440, directly through a firewall 405. It will be apparent to one skilled in the art that the enterprises could be connected to the end user 441 through an intranet, extranets or another communication network. Further, this connection may be wired or wireless, or a combination of both.

The control plane manager 403 recognizes the individual VLANs and captures information about the resources (systems, routers, storage, etc.) within the VLANs through a software implemented firewall. It monitors support information from the virtual enterprises (individual VLANs). The control plane manager 403 also provides proxy support within the UDC control plane firewall 405 which can be utilized to relay information to and from the individual VLANs. An advantage of a centralized control plane manager is that only one is needed for multiple VLANs. Prior art solutions required a physical support node for each virtual enterprise (customer) and required that support services be installed for each enterprise. Thus, in some embodiments of a UDC, the measurement monitors required to implement/monitor an enterprise for an SLA may be deployed at the NOC or control plane level only.

The network operation center (NOC) 450 is connected to the UDC control plane manager 403 via a firewall 401. The UDC control plane manager 403 communicates with the VLANs via a software implemented firewall architecture. In systems of the prior art, the NOC could not support either the control plane level or the VLAN level because it could not monitor or maintain network resources through the various firewalls. An advantage of the present invention is that the NOC 450 is able to communicate to the control plane and VLAN hierarchical levels of the UDC using the same holes, or trusted ports, that exist for other communications. Thus, an operator controlling the NOC 450 can install, maintain and reconfigure UDC resources from a higher hierarchical level than previously possible. This benefit results in both cost and time savings because multiple control planes and VLANs can be maintained simultaneously.

In an alternate embodiment, enterprise-level dependencies are stored within the SLA model. For instance, an e-business enterprise might require a minimum number of resources before a platinum-level SLA can be guaranteed. In this embodiment, the SLA modeling tool notifies the SALES-REP or customer that additional resources must be purchased to allow selection of a specific-level SLA. In other embodiments, when a specific-level SLA is selected, the additional required resources are automatically configured and priced.

In some embodiments, the end-customer purchases a system or enterprise from a mid-customer. The mid-customer owns the resources within a UDC and leases/sells enterprises to the end-customer. The UDC operators use the SLA modeling tool of the UDC supplier to enable the end-customer to select the appropriate level SLA. In one embodiment, the software installation package is generated by the UDC supplier. The UDC supplier maintains the integrity of the UDC, including monitoring appropriate quality of service (QoS) measurements.

In one embodiment, a customer with an existing enterprise in a UDC desires an SLA. In this case, the control plane controlling the components of the customer's enterprise automatically retrieves configuration information, or an environmental component description, corresponding to components in the enterprise. The environmental component description is comprised of relevant information about hardware, firmware, operating system (OS), applications, etc., that is necessary to determine differences between enterprises. A exemplary system for collecting enterprise configuration data is described in co-pending application Ser. No. 10/140,933 entitled "System And Method For An Enterprise-To-Enterprise Compare Within A Utility Data Center (UDC)," filed on May 9, 2002, and herein incorporated by reference.

Referring again to FIG. 1, the automatically prepared configuration file 131, corresponding to client system 125, is input to the model/analysis system and validation model 103. The GUI 101 is populated with the appropriate bundle or components so that the user may select a valid SLA-level and generate the SLA descriptor 109. The SLA descriptor 109 is translated by the management agent 111 to appropriate input for the SLA management system 123. The appropriate monitors and corresponding triggers, thresholds and notifications, as defined by the SLA, are then automatically deployed by the control plane to the components of the client system (enterprise) 125.

The efficiency of the present system and method is a significant improvement over methods of the prior art. In one embodiment, the present system and method provides a front end to an existing SLA management system. Implementing the SLA is the job of the SLA management system. The present system and method allows the SLA to be accurately and quickly generated in a automated fashion. Systems and methods of the prior art require component experts to use their personal knowledge and manually generate an SLA. These experts continually have to guess at what might work, or what might be appropriate, and they don't have any tools for building valid SLAs. A web site component expert needs to provide a tool for measuring availability of the web site, for example. The web site expert needs to know how to measure the website, based on its sub-components. Based on experience alone, this expert will manually put together measurement tools for looking at Internet traffic, or database accesses.

The present system and method automates the requirements of what tools are appropriate to be used for monitoring each component and then ties in a cost associated with a variety of thresholds. Once the SLA descriptor is written, the SLA is effectively implemented via the SLA management system. The SLA descriptor of the present system and method is automatically translated to the configuration files required by an SLA management system. In the prior art, these configuration files had to be generated manually.

The terms and descriptions used herein are set forth by way of illustration only and are not meant as limitations. Those skilled in the art will recognize that many variations are possible within the spirit and scope of the invention as defined in the following claims, and there equivalents, in which all terms are to be understood in their broadest possible sense unless otherwise indicated.

The invention claimed is:

1. A method for implementing support level agreements (SLAs), the method being executed by a computer comprising a processor and a memory comprising:

using the processor to receive a query from a customer, wherein the query defines required resources;

providing predetermined support level agreement options to the customer, based on the required resources, the predetermined support level agreement options are stored in the memory;

receiving the customer's selection of a predetermined support level agreement (SLA), wherein the predetermined SLA defines a plurality of measurement monitors and corresponding non-compliance thresholds and is stored in the memory; and using the processor to deploy an installation module containing one or more of customer selected measurement monitors and corresponding non-compliance thresholds to one or more target systems in response to a customer's request to implement the SLA, wherein a network service subject component defines a delivery mechanism for deploying the installation module, and wherein the installation module automatically generates a first deliverable that enables appropriate monitors, thresholds, and notification methods to be automatically installed on each target system, automatically generates a second deliverable that is a textual version of the SLA to be included in a provider contract to define one or more of target components and costs, and automatically installs one or more measurement monitors and notification processes on each target system.

2. The method as recited in claim 1, further comprising:

selecting at least one trigger value, the trigger value corresponding to a defined measurement monitor, wherein the at least one trigger value is selected to act as a warning before a measurement reaches a level of non-compliance as defined by the corresponding non-compliance threshold; and notifying an operator when the selected trigger value is reached.

3. The method as recited in claim 2, further comprising automatically upgrading the customer's available resources in response to the trigger notification.

4. The method as recited in claim 3, wherein the customer's required resources are from an enterprise, the enterprise residing in a virtual local area network (VLAN) in a utility data center (UDC), and wherein the upgrading is performed by a control plane management system in the UDC.

5. The method as recited in claim 4, further comprising:

responding to the trigger notification, by a network operation center (NOC) operator, the NOC being in the UDC; and reallocating resources within the UDC, by the NOC operator, to provide additional resources to the customer's enterprise.

6. The method as recited in claim 4, further comprising identifying a solution that allows the customer to meet all determined dependencies.

7. The method as recited in claim 1, further comprising determining enterprise dependencies corresponding to the selected SLA.

8. The method as recited in claim 7, further comprising notifying the customer that a dependency has not been met.

9. The method as recited in claim 1, further comprises:

generating a software installation package for deploying the customer's required resources corresponding the selected SLA, wherein the software installation package includes the installation module.

10. The method as recited in claim 9, wherein executing the software installation package on the customer's deployed resources automatically installs measurement monitors corresponding to non-compliance thresholds of the selected SLA, wherein the measurement monitors have means for notifying an operator if selected thresholds are reached.

11. The method as recited in claim 10, further comprising:

selecting at least one trigger value, the trigger value corresponding to a defined measurement monitor, wherein the at least one trigger value is selected to act as a warning before a measurement reaches a level of non-compliance as defined by the corresponding non-compliance threshold, wherein the measurement monitors have means for notifying the operator if selected triggers are reached; and notifying the operator when the selected trigger value is reached.

12. The method as recited in claim 1, wherein the query received is in a form of an environmental component description, the environmental component description being automatically generated by a control plane in a data center and corresponding to an enterprise within the control plane.

13. The method as recited in claim 12, further comprising: automatically deploying selected performance monitors, by an SLA management server, on components in the enterprise, wherein the selected performance monitors have thresholds corresponding to a selected SLA-level.

14. A service level agreement (SLA) modeling tool, comprising:
means for storing a plurality of component definitions, the component definitions having attributes describing available measurement monitors corresponding to the respective component, and having attributes describing allowable measurement ranges, wherein each component definition corresponds to one of a plurality of SLA levels;
a user interface enabling a user to select one or more stored components, wherein the user also selects one of the plurality of SLA levels, the SLA level defining a non-compliance threshold for each enabled measurement monitor;
means for deploying an installation module containing one or more of user selected measurement monitors and corresponding non-compliance thresholds to one or more target systems in response to a customer's request to implement the SLA, wherein a network service subject component defines a delivery mechanism for the means for deploying, and wherein the installation module automatically installs one or more measurement monitors and notification processes on each target system;
means for automatically generating a first deliverable that enables appropriate monitors, thresholds, and notification methods to be automatically installed on each target system;
means for automatically generating a second deliverable that is a textual version of the SLA to be included in a provider contract to define one or more of target components and costs; and
means for determining cost and penalty information related to the thresholds.

15. The SLA modeling tool as recited in claim 14, further comprising: means for deploying the SLA to an enterprise.

16. The SLA modeling tool as recited in claim 14, wherein the user can modify the threshold defined for an enabled monitor, and wherein modifying the threshold automatically updates the determined cost and penalty information.

17. The SLA modeling tool as recited in claim 14, wherein a trigger is selected for a corresponding measurement monitor, and wherein an operator is notified if a trigger level is reached, where the trigger level is used for a warning before a measurement reaches the non-compliance threshold.

18. A system for automatically implementing a service level agreement (SLA) in a utility data center (UDC), comprising:
a UDC having at least one control plane, each control plane controlling a plurality of components, the components comprising at least one virtual local area network (VLAN, or Enterprise);
an environmental component description corresponding to an enterprise in the UDC; and
a service level agreement (SLA) modeling system using the environmental component description of an enterprise to customize a display of a graphic user interface (GUI), wherein the GUI provides valid SLA choices for a user, the valid choices corresponding to the environmental component description, and wherein the SLA modeling system deploys an installation module containing the environmental component description to components of an enterprise in response to the user's request to implement the SLA, wherein a network service subject component defines a delivery mechanism for deploying the installation module, and wherein the installation module automatically generates a first deliverable that enables appropriate monitors, thresholds, and notification methods to be automatically installed on each target system, automatically generates a second deliverable that is a textual version of the SLA to be included in a provider contract to define one or more of target components and costs, and automatically installs one or more measurement monitors and notification processes on each component of the enterprise.

19. The system as recited in claim 18, wherein the SLA modeling system further comprises:
a plurality of component models defining possible components of the enterprise, and wherein the one or more measurement monitors defining valid monitors corresponding to the possible components in a component model, wherein a measurement monitor has a least one associated threshold, and wherein the environmental component description determines which component models and corresponding monitor models are displayed in the GUI.

20. The system as recited in claim 18, wherein the user selects a plurality of components corresponding to the environmental component description and associates at least one measurement monitor to at least one of the plurality of selected components, wherein a threshold is associated with the at least one measurement monitor, the threshold corresponding to an SLA-level, the selections resulting in a deployable SLA.

* * * * *

UNITED STATES PATENT AND TRADEMARK OFFICE
CERTIFICATE OF CORRECTION

PATENT NO. : 7,583,607 B2  
APPLICATION NO. : 10/379662  
DATED : September 1, 2009  
INVENTOR(S) : Douglas W. Steele et al.

It is certified that error appears in the above-identified patent and that said Letters Patent is hereby corrected as shown below:

On Sheet 4 of 4, in Figure 4, in Box 440, line 2, delete "EXTARNET" and insert -- EXTRANET --, therefor.

In column 12, line 43, in Claim 19, delete "a least" and insert -- at least --, therefor.

Signed and Sealed this

Fifteenth Day of June, 2010

David J. Kappos
*Director of the United States Patent and Trademark Office*